United States Patent [19]
Diefendorff et al.

[11] Patent Number: 5,268,995
[45] Date of Patent: Dec. 7, 1993

[54] METHOD FOR EXECUTING GRAPHICS Z-COMPARE AND PIXEL MERGE INSTRUCTIONS IN A DATA PROCESSOR

[75] Inventors: Keith E. Diefendorff; William C. Anderson, both of Austin, Tex.

[73] Assignee: Motorola, Inc., Schaumburg, Ill.

[21] Appl. No.: 616,973

[22] Filed: Nov. 21, 1990

[51] Int. Cl.⁵ .............................. G06F 15/66
[52] U.S. Cl. .................... 395/122; 395/121; 395/162
[58] Field of Search ........... 395/121, 122, 118, 119, 395/162, 164; 340/747, 750, 729

[56] References Cited

U.S. PATENT DOCUMENTS

| | | | |
|---|---|---|---|
| 4,992,780 | 2/1991 | Penna et al. | 340/729 |
| 5,081,698 | 1/1992 | Kohn | 395/122 |
| 5,144,291 | 9/1992 | Mishizawa | 340/729 |

*Primary Examiner*—Phu K. Nguyen
*Attorney, Agent, or Firm*—Charlotte B. Whitaker

[57] ABSTRACT

A method for performing graphics Z-compare and pixel merge operations, for use in a Z-buffering system to remove hidden surfaces when displaying a three-dimensional image, is provided. The data processing system includes a main memory for storing data and instructions, and a graphics execution unit for executing graphics instructions. The graphics execution units are connected to an instruction sequencer, which provides instructions and data operands to the execution units, via a communications bus. In response to receiving Z-compare and pixel merge instructions, the graphics execution unit compares one or more Z-axis coordinates within a first data operand to one or more Z-axis coordinates in a corresponding bit-field position within a second data operand to determine a relative Z-axis position of each of the one or more pixels associated with the one or more Z-axis coordinates. A pixel compare result bit-vector uniquely representing the possible results of comparing each of the corresponding bit-field positions is stored in a register. Utilizing the pixel compare result vector, the graphics execution unit executes a pixel merge instruction, to selectively store the pixels in an image buffer.

7 Claims, 6 Drawing Sheets

FIG. 1 —PRIOR ART—

METHOD FOR EXECUTING GRAPHICS Z-COMPARE AND PIXEL MERGE INSTRUCTIONS IN A DATA PROCESSOR

FIELD OF THE INVENTION

This invention relates generally to the rendering of three-dimensional graphic images, and more particularly to a method for the rendering of three-dimensional graphic images using a data processor.

CROSS REFERENCE TO RELATED APPLICATIONS

This application is related to an application Ser. No. 07/613,440 entitled "A Method for Executing Graphics Pixel Packing Instructions in a Data Processor", by Keith Diefendorff et. al, filed on Nov. 15, 1990 and assigned to the assignee hereof.

This application is also related to an application Ser. No. 07/613,438 entitled "A Method for Executing Color Graphics Saturating Arithmetic Instructions in a Data Processor", by Keith Diefendorff et al, filed on Nov. 15, 1990 and assigned to the assignee hereof.

BACKGROUND OF THE INVENTION

Today's high performance interactive display systems (e.g. personal computers and workstations) require specialized graphics assist hardware, or complex three-dimensional (3-D) rendering programs, to generate realistic, animated 3-D images. Essentially, the graphics task is to convert an image, stored as an abstract representation of primitive shapes, and render that image as a realistic scene on a computer display. The graphics problem is to do it with dispatch. Shown in FIG. 1 is a block diagram 10 illustrating a known process for rendering realistic, animated three-dimensional (3-D) images. The process consists of five major steps, and is computationally intensive. Depending upon the system, some of the process steps may be performed in software, with the remainder being performed using graphics assist hardware. An image is typically represented as a group of mathematically described objects specified by shape, coordinates, surface properties, and color values. In the first step, the viewpoint transformation process 11, the objects must undergo a series of mathematical transformations (matrix multiplications) to orient the objects in space relative to the viewer, scale them to the right size, adjust for perspective foreshortening, and clip to the desired display volume. Coordinates are almost exclusively maintained and manipulated as floating point numbers.

In the second step, the lighting process 12, lighting models define the lighting to be applied to the image. In this step, ambient, diffuse, and specular lighting models can be applied to the image. Surface detail polygons may be added to simulate texture. Color and lighting information is resolved to a RGB triple at each polygon vertex which specifies the component intensities of the three additive primary colors, red, green, and blue. Normally these component intensities are "fixed point values".

During the shading process 13, the third step, the image must be clipped, projected into two-dimensions, and mapped from image coordinate space to display coordinates. Accordingly, the image is flattened, or decomposed, into simple triangles or scan aligned trapezoids. Shading algorithms are applied to make polygon facets appear solid, to smooth polygonally approximated surfaces, and to convert polygons to an array of pixels suitable for display on a raster scan display device. Color values are interpolated from vertex normals by averaging surface normals of adjacent polygon facets. Then, either linear intensity (Gouraud) or normal-vector (Phong) interpolation is performed to shade each polygon. Color slope for each scan line crossing the polygon is computed and used to calculate the color of each pixel on the scan line internal to the polygon. The "color" of each pixel is stored as a triple—one channel for each of the three additive primary colors, red, green, and blue. As pixels are computed, depth information is applied to remove hidden surfaces using various algorithms such as Z-buffering. Anti-aliasing corrections may also be applied to remove discrete-pixel spatial sampling errors which cause object edges to appear jagged.

Three types of shading are commonly used: constant shading, Gouraud shading, and Phong shading. The computational complexity of the constant shading algorithm is less than that of Gouraud and Phong. The image quality of constant shading is inferior to that of Gouraud and Phong, since the constant shading algorithm generates flat looking images with visible facets. The Gouraud shading algorithm provides a marked improvement in the image quality. The Gouraud algorithm is a "scan-line" algorithm which uses linear interpolation to compute the color of the first and last pixel on each scan line crossing the polygon. The linear interpolation requires a high level of computation complexity, thus, making Gouraud shading a prime candidate for use in hardware graphics accelerators. The Phong shading algorithm provides an even higher image quality, but the algorithm is even more computationally difficult, and requires substantial amounts of special hardware to make execution of the algorithm fast enough for continuous use in high resolution interactive displays. Consequently, Phong shading is primarily used in applications requiring high quality output, such as film generation, which allow a trade-off between time and image quality.

Image processing 14 occurs during the fourth step to facilitate both convenient and efficient manipulation of individual objects in a scene independently. In order to accomplish independent manipulation of individual objects, a mechanism is provided for placing one object on top of another. The algorithm must handle the images correctly in the case of transparency, and must blend object edges smoothly (anti-aliasing). For example, if a foreground object is rotated, it is more efficient to simply re-render that object than the entire scene. This is accomplished using compositing algorithms, capable of smoothly blending multiple images. Such algorithms are also capable of accurately rendering the effect of object transparency. Typically, image compositing algorithms utilize a fourth channel, called alpha ($\alpha$), which is appended to the three (RGB) color channels of each pixel. The value of alpha specifies the percentage of a pixel covered by an object. Using, alpha, the net contribution of a foreground and background object can be computed by interpolation to give a composite color value.

The image is displayed in the final step, image display 15. As the color of each pixel is computed, it is stored in memory as an array of pixels or displayed on the screen by writing it into the frame buffer. The image must be transferred to and from the display system's frame buffer within the context of the governing windowing system. Fast Bit Block Transfers (bitblt), area fills, line drawing algorithms are required to rapidly move images between memory and the frame buffer. Once pixels are placed into the frame buffer, specialized display system hardware constantly scans the frame buffer in sync with the cathode ray tube's (CRT's) raster scan using the pixel data stored in the frame buffer to modulate the intensity of the CRT's red, green, and blue electron guns, and thereby forming the image on the screen. Thus, an important graphics task is to convert an image stored as an object description into a raster image in a pixel array in memory (or a frame buffer). Essentially, the electron beam(s) intensity is modulated by the data read from the frame buffer in sync with the raster scan, to create a visible image on the screen.

Typically, graphics display systems use three different frame buffer styles: 32-bit true color, 16-bit dithered true color, and 8-bit pseudocolor. The 32-bit true color format is used for high quality displays in the hi-end personal computer and workstation applications. Typically 8-bits are used for each of the three (RGB) color channels and stored packed in a single 32-bit word. The 16-bit dithered true color is used for medium cost color displays, wherein 4–5 bits are used for each of the three (RGB) color channels and two pixels are stored for each 32-bit word. The 8-bit pseudocolor frame buffer system is used for low-end color and high-end grayscale displays. Generally, in the pseudocolor frame buffer, 8-bits per pixel are used, and four pixels are stored in a 32-bit word.

Microprocessors having high performance floating point capabilities may be used to rapidly perform viewpoint transformation and lighting calculations on complex images. In addition, microprocessors with flexible data manipulations and high data throughput can efficiently run the algorithms (e.g. bitblt) necessary to achieve good display system performance. The shading, raster conversion, and image processing phases of the problem, however, are computation intensive and require hardware support beyond that found in most conventional microprocessors to achieve good interactive performance. Generally, 3-D graphics rendering programs on general purpose microprocessors use "constant" shading algorithms to avoid the more computationally intensive algorithms; however, these microprocessors generate inferior images to Gouraud and Phong shading. Typically, special purpose image rendering hardware is very expensive, and is difficult to integrate into a system.

Three dimensional objects are stored with all facets completely specified to allow the object to be viewed from any position in space. When the object is rendered for display, the objects are transformed into a set of polygons and drawn in an image buffer. While rendering the object, it is necessary to prevent the hidden surfaces of the object from being displayed in the final image. A technique commonly used for removing hidden surface in the final image is Z-buffering. A Z-buffer is an array, similar to the pixel array, which is used to hold the Z-value for each pixel in the image. A Z-value represents the Z-axis depth (coordinate) of a pixel. When a pixel is drawn into the image array, the Z-value of the new pixel is compared to the Z-value of the pixel currently in the image array. If the new pixel is closer to the viewer than the currently displayed pixel, the intensity values for that pixel are stored in the frame buffer, and the associated Z-value is placed in the Z-buffer. Conversely, if the new pixel is farther away from the viewer than the currently displayed pixel, the new pixel is not stored. Thus, only the surfaces closest to the viewer are displayed on the screen.

Today's Z-buffers typically hold 16-bit integer Z-values; however, 16-bit Z-values often do not have sufficient dynamic range to accurately delineate close foreground objects and distant backgrounds. Consequently, the graphics industry is moving toward higher precision Z-values, such as 32-bit integers or floating point numbers. Since 3-D graphics rendering algorithms are computationally intense, it is desirable to provide graphics instructions, for use in a conventional microprocessor, to accelerate the performance of the microprocessor during the shading, and image processing phases.

SUMMARY OF THE INVENTION

A method for executing graphics Z-compare and merge instructions, in a data processing system, to determine whether to display a pixel of a three-dimensional image is provided. The data processing system includes a main memory for storing data and instructions, and dedicated execution units for executing instructions of a selected type. The dedicated execution units include an arithmetic logic execution unit, a floating point execution unit for executing floating point instruction, and a graphics execution unit for executing graphics instructions. The executions units are connected to an instruction sequencer, which provides instructions and data operands to the execution units, via a communications bus. In response to issuance of compare and merge instructions, a selected number of operands are transferred from a register file to the graphics execution unit, via the communication bus. The selected data operands comprise one or more values representing a predetermined number of Z-axis coordinates, each of the predetermined number of Z-axis coordinates are associated with one pixel of the three-dimensional image in an X, Y, Z Cartesian coordinate system.

The graphics execution unit compares one or more Z-axis coordinates within a first data operand to one or more Z-axis coordinates in corresponding bit-field positions within a second data operand to determine a relative Z-axis position of each of the one or more pixels associated with the one or more Z-axis coordinates. The graphics execution unit then encodes a pixel compare result bit-vector to uniquely represent possible results of comparing each of said corresponding bit-field positions, and stores the result bit vector in the register me. In a first embodiment, the encoding of the pixel compare result bit-vector is designed such that a predefined set of most likely comparison results are readily detectable using a single bit test performed during a subsequent software routine. In a preferred embodiment, the pixel compare result bit-vector which was temporarily stored in the register file, is subsequently used by the graphics execution unit during the execution of a pixel merge instruction, to generate a final result operand consisting of one or more pixels for storage in memory or a video frame buffer.

DETAILED DESCRIPTION OF A PREFERRED EMBODIMENT

Figure 1:
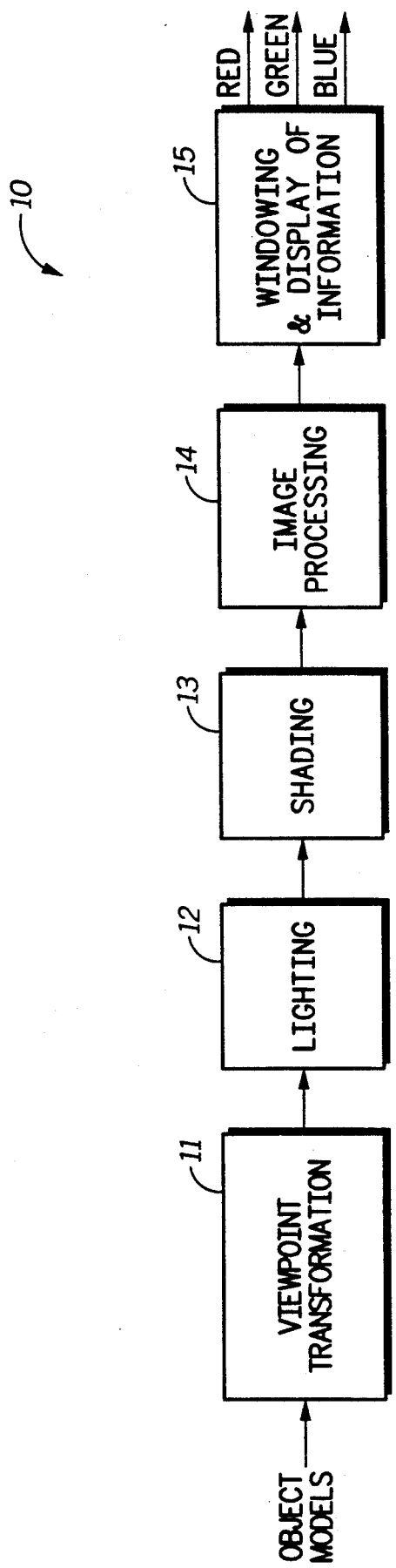
FIG. 1 is a block diagram illustrating a known process for rendering three-dimensional images in a data processing system.
Figure 2:
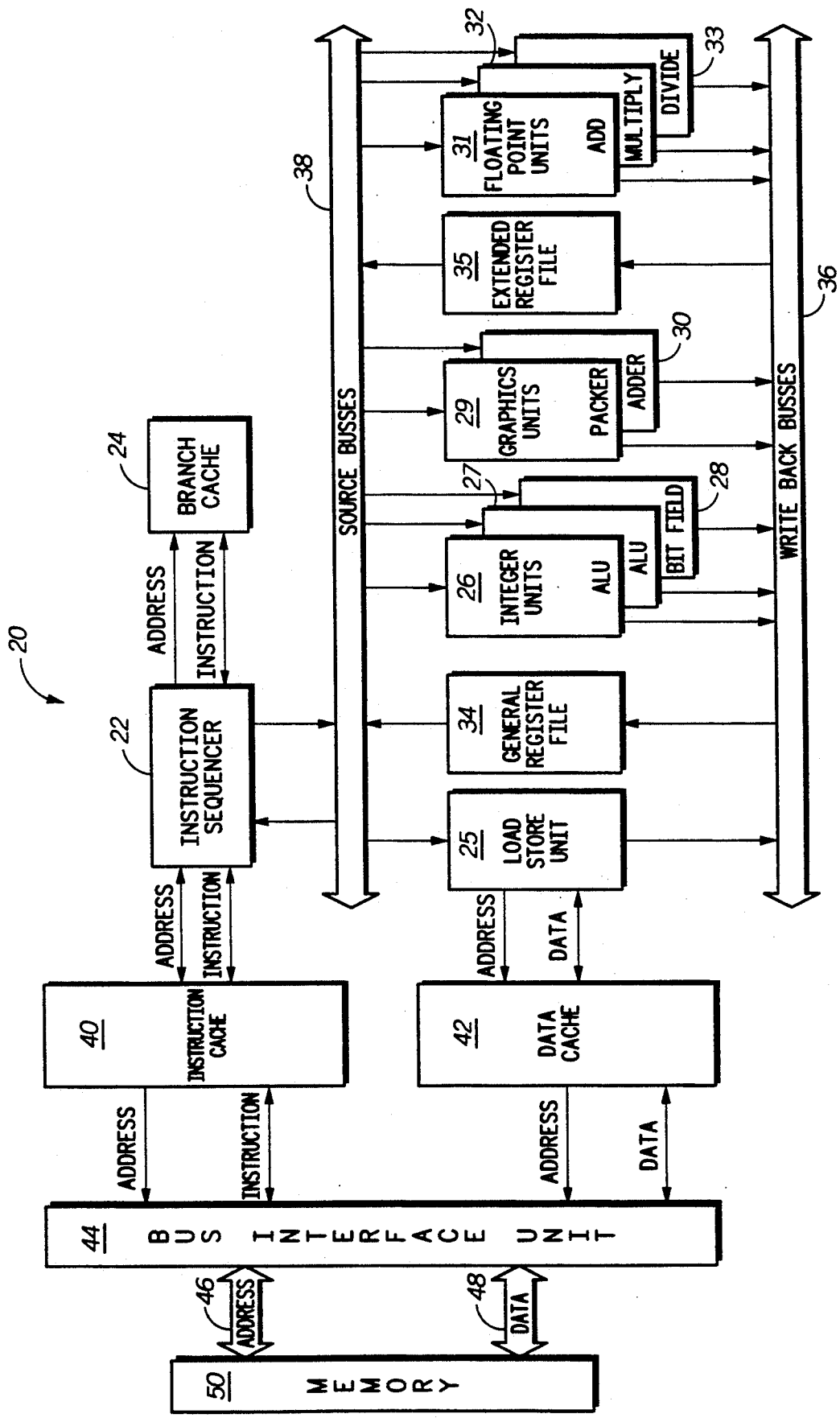
FIG. 2 is a block diagram illustrating a data processing system for implementing the present invention.

Shown in FIG. 2 is a block diagram illustrating an integrated circuit data processing system 20 for implementing the present invention. In a preferred embodiment, data processing system 20 comprises an instruction sequencer 22, a branch cache 24, load/store units 25, integer execution units 26-28, graphics execution units 29-30, floating point units 31-33, and register files 34 and 35, The instruction sequencer 22 provides control over the data flow amount to execution units 25-33, and the register files 34-35. Accordingly, the instruction sequencer 22 implements a 4-stage (fetch-decode-execute-writeback) master instruction pipeline, enforces data interlocks, dispatches (issues) instructions to available execution units 25-33, directs data from the register files 34-35 onto and off of the busses 36 and 38, and maintains a state history so it can back the system 20 up in the event of an exception.

In the preferred embodiment, the integer execution units 26-28 comprises two identical arithmetic logic units (ALU's) 26, and 27, and one bit-field unit (BFU) 28. Each subunit has a one clock execution phase and can process instructions at a throughput rate of one instruction per clock. The graphics units comprise a graphics packer unit 29 and a graphics adder unit 30, and each unit executes graphics instructions in a single clock. The floating point adder (ADD) 31 and multiplier (MULTIPLY) 32 units execute floating point instructions in three clocks (independent of the operand precision) but are fully pipelined to allow new instructions to issue every clock. The floating point divide unit (DIV) 33 is a non-pipelined iterative design. The DIV unit 33 is shared between floating point and integer divide operations. The results produced by the floating point units 31-33 are exact IEEE results with no software fix-up required. The floating point units 31-33 run concurrently with all other execution units 26-29 and any mix of integer, memory, graphics, and floating point operations can be issued together in the same dock.

In accordance with the preferred embodiment, a large 32-word general purpose register file (GRF) 33 provides operands for integer, logical, bit-field, memory addressing, graphics, and floating point operations. In addition, an extended 32-entry register file (XRF) 34 provides additional storage for floating point operands.

The XRF 34 can hold 32 values of any precision (single, double, or extended). There are two writeback busses 36 available to the execution units 25-33. For the purpose of simplification, the term "write-back" will be used when a particular execution unit transfers information onto one of the two buses comprising the writeback busses 36. Execution units 25-33 are each independent functional units with their own internally controlled pipelines. When an execution unit finishes execution of an instruction it places the result data onto a writeback bus 36. The register files 33-34 take the data off the writeback busses 36 and store it into the correct destination register. If another instruction is waiting for this data, it is "forwarded" past the register files 33-34 directly into the appropriate function unit(s). This allows a data dependent instruction to issue on the next clock without waiting for the data to be written into the register file and read out again. Since different execution units have different pipeline lengths, it is possible for more than two instructions to be completing in a given clock cycle. Consequently, execution units 25-33 arbitrate for an available slot on a writeback bus 36. The highest writeback priority is granted to single cycle execution units, such as the integer units 26-27, and the graphics units 29-30, so that single cycle instructions are always guaranteed a writeback slot while multistage pipeline units, such as floating point units 31-33 and load/store units 25, arbitrate for writeback slots. Pipelined execution units which are denied a writeback slot, will continue to advance their internal pipeline stages and accept new instructions until all pipeline stages are full.

Internally, data processing system 20 uses a Harvard architecture with separate paths for the instruction stream and the data stream. Separate caches 40, and 42 are used to supply the two streams. On cache hits, the instruction cache 40 can deliver two instructions and the data cache 42 can accept or deliver a 64-bit operand each clock. Cache misses are serviced by filling the cache line with a burst bus transaction beginning with the address of the missed datum (or instruction). During the line fill, instructions or data are streamed directly from the bus to their respective units. Data cache coherency among multiple processors is maintained by bus snooping. Separate tags are maintained so that snoop activity does not interfere with normal processor accesses.

In accordance with the preferred embodiment, the sequencer 22 is responsible for instruction flow in system 20. Sequencer 22 retrieves instructions from an instruction cache 40 and branch accelerator cache 24, and dispatches the instructions to one of the execution units 25-33 based on availability and inter-instruction data dependencies. A maximum of two instructions are decoded and considered for issue to the execution units 25-33 on each dock. The pipeline stages are fully hardware interlocked so that data dependencies will automatically stall instruction issue without software assistance. When an instruction "issues", the source data for that instruction is transferred from a source register in the general register file 34 onto the source operand busses 38, and the associated destination register is marked "busy". A hardware scoreboard maintains a record of all busy registers. The execution unit 25-33, to which the instruction issues then reads data off the appropriate source bus 38. The register files 34-35 and source busses 38 have sufficient bandwidth to sustain execution throughput at the peak rate of two instructions per clock. When the instruction is complete, the destination register is written with the result data, and the busy bit for the register is cleared.

The data types used in graphics system are unique. Often, data is packed tightly to conserve storage and improve memory bandwidth utilization. Thus, using conventional instructions to operate on graphics data may causes a performance bottleneck. The graphics units 29–30 implement a set of instructions which are designed to operate on graphics data in a manner which accelerates the rendering of 3-D color graphics images. Each of the graphics units execute instructions in a single clock; however, they are not identical and each can accept only one instruction, of the type it executes, per clock. In the preferred embodiment, these graphics units 29–30 perform efficient manipulation of pixels by operating on multiple bit-fields, within 64-bit operands, in parallel. All graphics operands are located in the general register file 33, therefore, no special registers or temporary registers are needed. Thus, the graphics instructions provide the same generalized flexibility as the other instructions (i.e. floating point, integer) executed by data processing system 20. The graphics adder unit 30 is a dual 32-bit adder with controllable carry chains on each 8-bit boundary. Arithmetic is carried out using either modulo or saturation arithmetic. Overflow and underflow detection and maximum and minimum field values are dependent on whether the operands are two's complement signed numbers (hereafter referred to simply as "signed") or unsigned numbers. The graphics pixel packing unit 29 is a specialized bit-field unit for packing, unpacking, and shifting pixel or fixed-point data. It operates on multiple bit-fields within 64-bit operands in parallel.

The data processing system 20 reads graphics data in 64-bit quanta, and then allows individual fields within the 64-bit words to be processed in parallel—avoiding the need to pull them apart and operate on them individually. In the preferred embodiment of the present invention, the graphics units 29–30 execute graphics instructions using "pixel-at-a-time" processing. In pixel-at-a-time processing, all color channels for a given pixel are completely processed before proceeding to the next pixel. Thus, for example, the graphics units 29 would initially process the red and green color channel of a pixel in a selected graphics instruction, then process the blue and alpha channel of the same pixel before moving on to the next pixel on the scan line.

Data processing system 20 employs the Z-buffering technique to prevent hidden surfaces of an object from being displayed in the final image. Accordingly, the data processing system 20 performs Z-value comparisons to determine whether a new pixel is closer to the viewer than a pixel currently stored in the image array. As previously indicated, if the new pixel is closer, the data processing system 20 will store the intensity values for that pixel in memory 50 or a video frame buffer (not shown); and the associated Z-value will be stored in the Z-buffer (not shown). In the preferred embodiment of the present invention, Z-compare and pixel merge instructions are used to accelerate the performance of data processor 20 during the Z-buffering process. The pixel compare instruction may be used to compare 32-bit unsigned integers or positive single precision floating point numbers.

Figure 3:
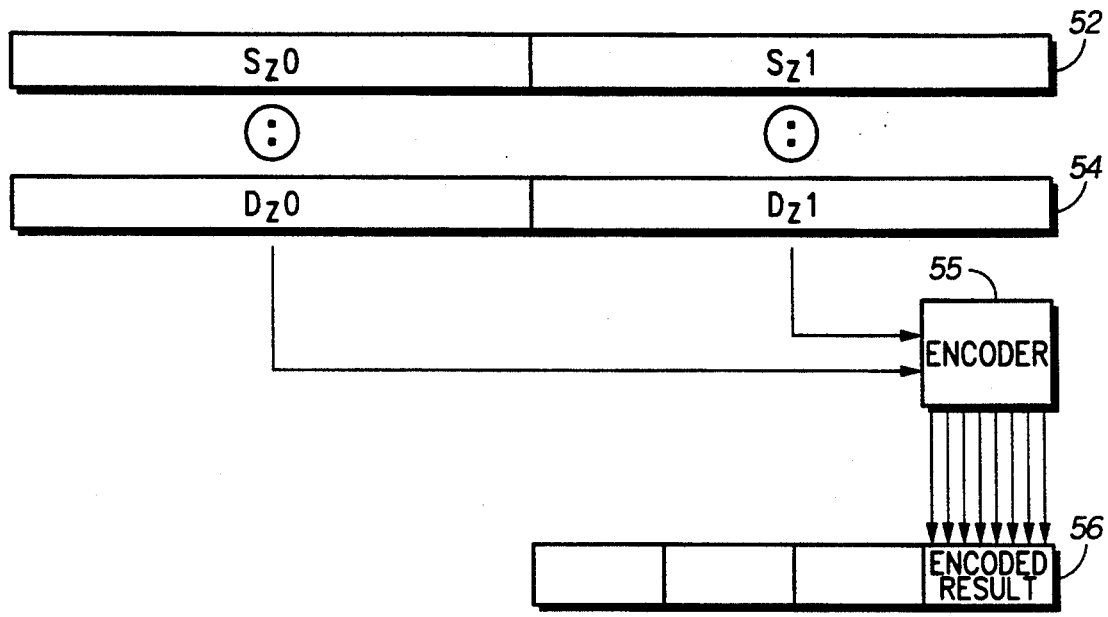
FIG. 3 is a diagram illustrating the operation of a Z-compare graphics instruction, in accordance with the present invention.

FIG. 3 illustrates the operation of a pixel compare instruction, in accordance with a first embodiment of the present invention. The sequencer 22 issues the pixel compare instruction, and transfers the selected data operands from the general register file 34 to the graphics adder unit 30, via the source bus 38. Accordingly, as shown in FIG. 3, a first source operand, which contains two 32-bit fields ($S_z0$ and $S_z1$) representing the Z-values for two new pixels, is retrieved from register 52. A second source operand, which contains two 32-bit fields ($D_z0$ and $D_z1$) representing the Z-values for two currently stored pixels (D0, D1) is retrieved from register 54. The graphics adder unit 30 performs the two 32-bit Z-value comparisons (as denoted by the colon ":" in a circle) to determine whether the two new pixels (S0, S1) are closer than the corresponding two currently stored pixels (D0, D1). The results of the two 32-bit comparisons are encoded by an encoder 55, to generate a Z-compare result, which is placed into destination register 56. The encoded result (denoted by the gray field in register 56) is designed to facilitate fast decoding using a pixel merge operation performed by software. The bits are encoded in a manner consistent with the most likely outcome of the comparisons, to generate a result bit vector which can be quickly decoded in software. For example, in a 4-bit Z-compare result [b3:b0], each bit in the 4-bit result field represents one of the four possible outcomes on the Z-comparisons. Thus, the encoder 55 will set (logic "1") one of the bits in the 4-bit field according to the results of the Z-comparison. For example, the least significant bit (b0), when set, indicates that the least significant pixel (and Z-value) needs to be stored, but not the most significant pixel. When set, a second bit (b1) indicates that the most significant pixel needs to be stored, but not the least significant pixel. A third bit (b2), when set, indicates that neither pixel needs to be stored. A fourth bit (b3), when set, indicates that both pixels need to be stored. In the present invention, the four bits are tested in the order they are most likely to occur. For example, the bit indicating both pixels need to be stored (b3) is tested first, and then the bit indicating that neither pixel needs to be stored (b2) is subsequently tested, etc. This ordering is based upon the high probability of long strings of either visible or not visible pixels and the relative infrequency of crossing over from a visible surface to a hidden surface.

Figure 4:
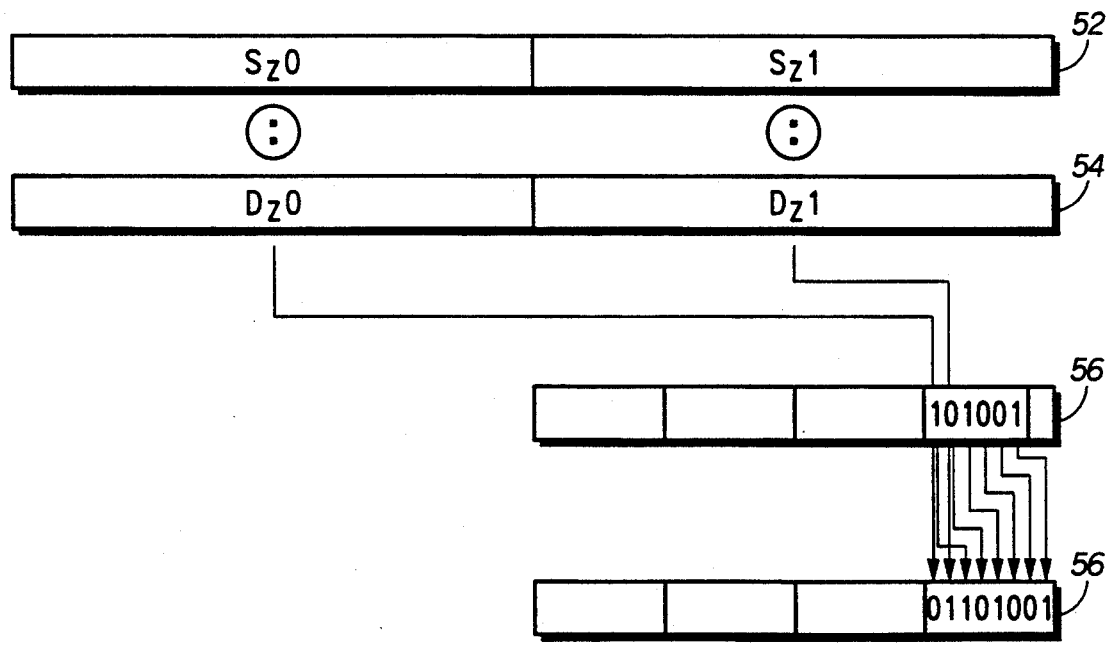
FIG. 4 is a diagram illustrating the operation of a Z-compare graphics instruction, in accordance with an alternate embodiment of the present invention.

FIG. 4 illustrates the operation of a Z-compare instruction, in accordance with a preferred embodiment of the present invention. The Z-compare instruction operates on multiple bit-fields within the 64-bit operands. When the sequencer 22 issues a Z-compare instruction, the field size (T) encoded in the instruction is used to control how the graphics adder unit 30 performs the comparisons. In the example depicted in FIG. 4, the field size T is 32-bits. Thus, once again, the graphics adder unit 30 will perform two 32-bit comparisons in parallel. As previously, described, the source operands ($S_z0$, $S_z1$), representing the Z-values for the two new pixels (S0 and S1), are retrieved from register 52 for comparison to the Z-values ($D_z0$, $D_z1$) for the two currently store pixels (D0 and D1) retrieved from register 54. As shown in FIG. 4 (for illustrative purposes only) a third operand, retrieved from register 56, contains the results accumulated ("101001XX", where X indicates the "don't care" bits in the third operand) from prior Z-compare instructions. The graphics adder unit 30 shifts the third operand to the right by (64/T) bit positions, and compares the two 32-bit fields of the first operand to the corresponding fields in the second operand using unsigned arithmetic. The single bit greater-than condition result from each field comparison is placed into the most significant bits of the lower order byte of the third operand, to form a final mask value. It should be apparent to one skilled in the art that the graphics adder unit 30 could shift the third operand to the left by (64/T) bit positions, and insert the result bits from each comparison into the least significant bits of the lower order byte of the third operand.

In the present invention, the Z-compare instruction is repeated four times to accumulate the results of the Z-comparison for eight pixels. Consequently, an 8-bit mask value is generated indicating the results of the eight Z-comparisons. Accordingly, shown in FIG. 4, for illustrative purposes only, are the results generated by performing the last of the four Z-compare instructions. In the example provided in FIG. 4, the Z-value for the newly computed pixel S0 ($S_Z0$) was less than the Z-value for the currently stored pixel D0 ($D_Z0$), and the Z-value for newly computed pixel S1 ($S_Z1$) was greater than the Z-value for the currently stored pixel D1 ($D_Z1$). Consequently, the final mask value generated is "01101001". Thus, each bit of the final mask value corresponds to the result of one comparison between the Z-values for each of the newly computed pixels S0 through S7, and the currently stored pixels D0 through D7.

Figure 5:
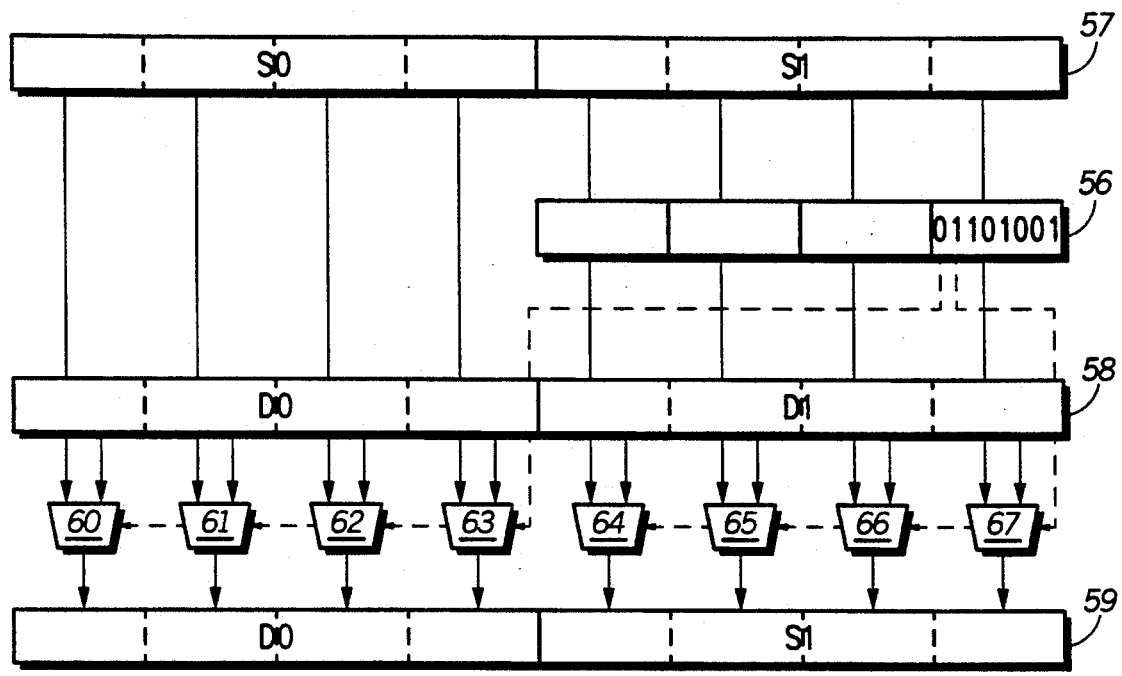
FIG. 5 is a diagram illustrating the operation of a 32-bit pixel merge instruction used in conjunction with the Z-compare instruction shown in FIG. 4.

In accordance with the preferred embodiment of the present invention, a subsequent pixel merge instruction uses the mask value in register 56 to store the corresponding 32-bit pixels (where each pixel comprises four color channel intensity values αRGB). FIG. 5 illustrates the operation for performing a pixel merge instruction according to the preferred embodiment of the present invention. The sequencer 22 issues a pixel merge instruction, and transfers the selected data operands to the graphics packer unit 29. Multiplexors 60–67 have a first input for receiving a newly computed pixel (comprised of four 8-bit fields) from register 57, and a second input for receiving a currently stored pixel (comprised of four 8-bit fields) from register 58, and an output for providing the selected 32-bit pixel to a destination register 59 in register file 34. In the example provided, the upper 2-bits of the mask value ("01101001") previously generated using the Z-compare operation (as shown in FIG. 4) are used to provide the select signals for controlling the eight multiplexors 60–67 (as shown in FIG. 5). Accordingly, a first data operand which contains the two newly computed pixels, designated as S0 and S1, is retrieved from register 57. Similarly, a second data operand which contains the currently stored pixels, D0 and D1, is retrieved from register 58. A sub-field (bits b7 and b6) of the mask value previously generated using the Z-compare operation (as shown in FIG. 4) is used to select which two 32-bit pixels to store in register 59. The sub-field used to control the select signals for the multiplexors 60–67 is determined by the pixel merge instruction opcode. In the present invention, pixels in register 57 associated with logic "1's" in the corresponding bit positions in the mask register 56 are selected by the associated multiplexor for merger into the register 59, as shown in FIG. 5. Similarly, fields in register 58 associated with logic "0's" in mask register 56 are selected by the associated multiplexor for merger into the register 59. Thus, the final result operand is stored in register 59 in the register file 34. Essentially, the mask value was used to determine which pixels will ultimately be stored in the memory 50 or a frame buffer (not shown).

Figure 6:
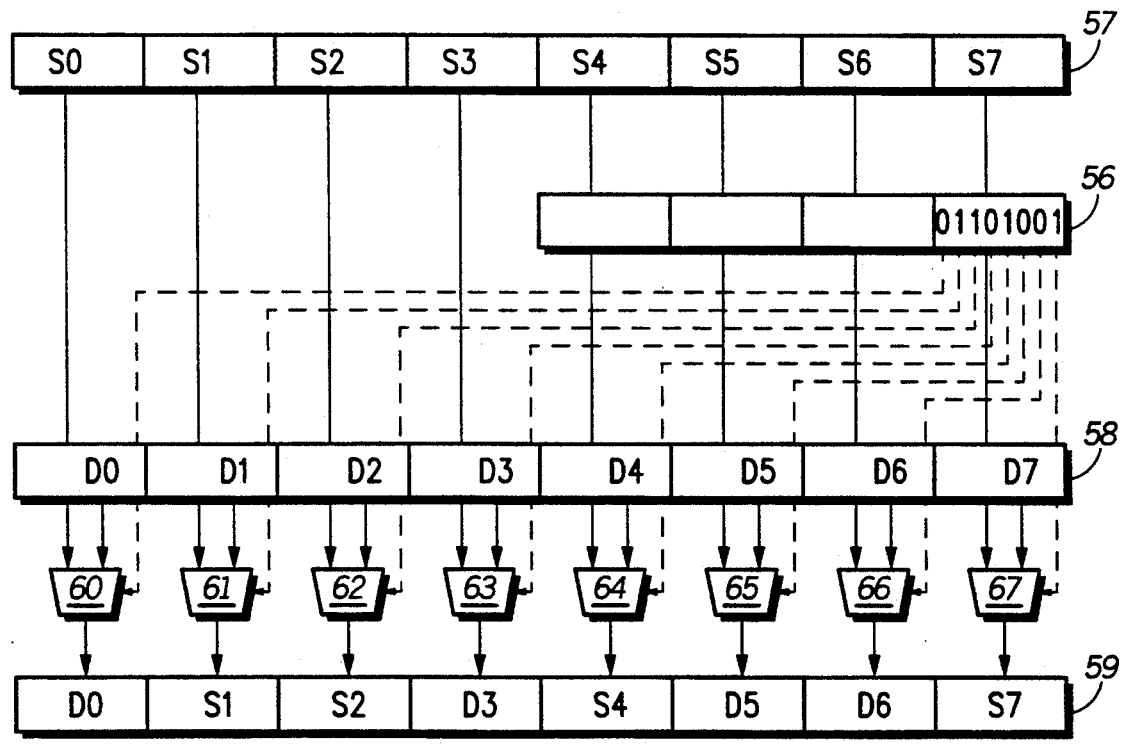
FIG. 6 is a diagram illustrating the operation of an 8-bit pixel merge instruction used in conjunction with the Z-compare instruction shown in FIG. 4.

FIG. 6 illustrates the operation for performing the pixel merge instruction using the 8-bit mask value to merge 8-bit pixels. Once again, the sequencer 22 issues a pixel merge instruction, and transfers the selected data operands to the graphics packer unit 29. Multiplexors 60–67 have a first input for receiving a newly computed pixel (where each pixel comprises an 8-bit field) from register 57, and a second input for receiving a currently stored pixel (comprising an 8-bit field) from register 58, and an output for providing the selected 8-bit pixel to a destination register 59 in register file 34. In the example provided, the entire 8-bit mask value ("01101001") previously generated using the Z-compare operation (as shown in FIG. 4) is used to provide the select signals for controlling the eight multiplexors 60–67 (as shown in FIG. 6). Accordingly, a first data operand which contains the eight newly computed pixels, designated as S0 through S7, is retrieved from register 57. Similarly, a second data operand which contains the currently stored pixels, D0 through D7, is retrieved from register 58. The mask value previously generated using the Z-compare operation (as shown in FIG. 4) is used to select which pixels to store in register 59. In the present invention, pixels in register 57 associated with logic "1's" in the corresponding bit positions in the mask register 56 are selected by the associated multiplexor for merger into the register 59, as shown in FIG. 6. Similarly, fields in register 58 associated with logic "0's" in mask register 56 are selected by the associated multiplexor for merger into the register 59. Thus, the final result operand is stored in register 59 in the register file 34. Essentially, the mask value was used to determine which of the eight pixels will ultimately be stored in the memory 50 or a frame buffer (not shown).

Figure 7:
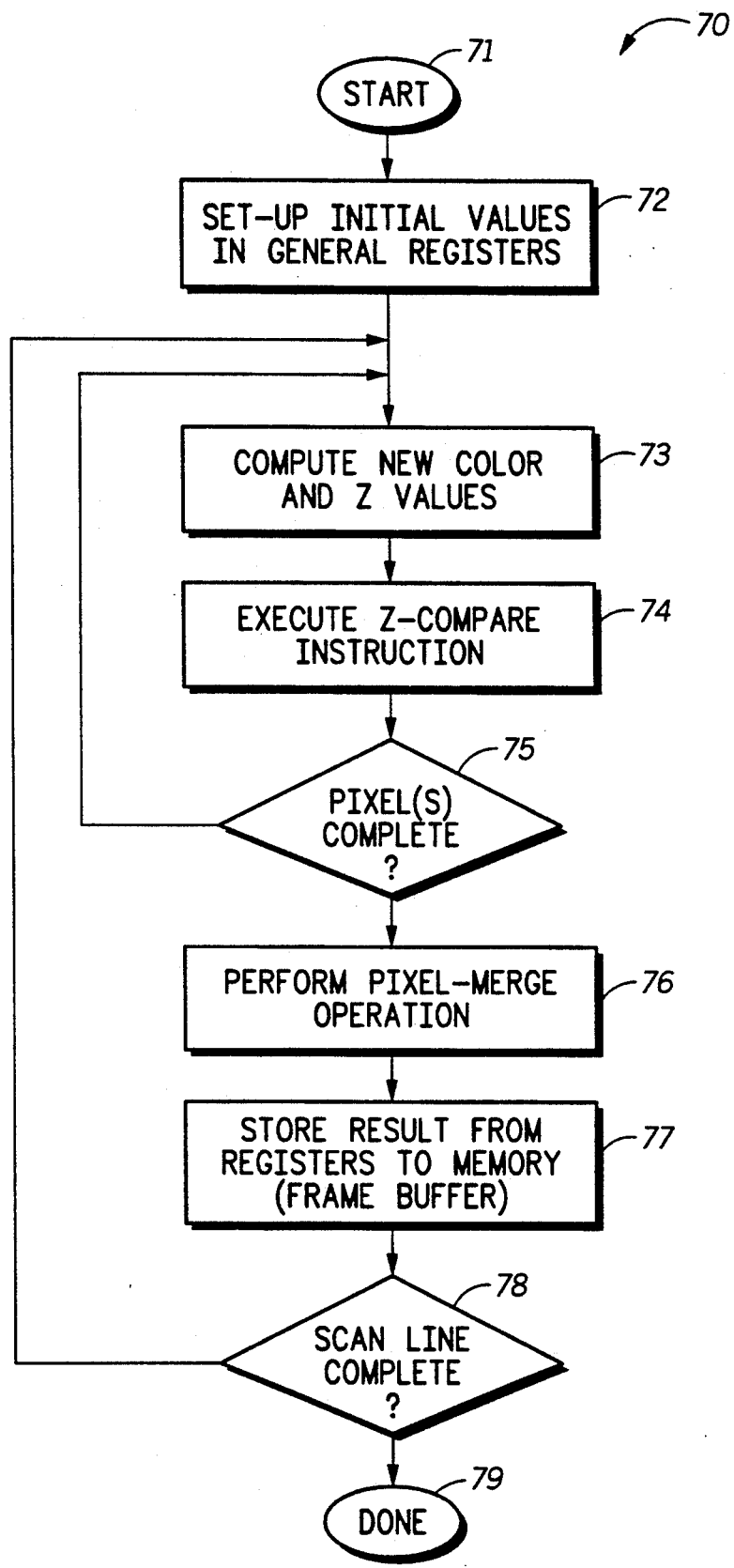
FIG. 7 is a flow diagram for performing Z-buffering during a shading process, using the Z-compare and pixel merge instructions, in accordance with the present invention.
Figures 8, 9:
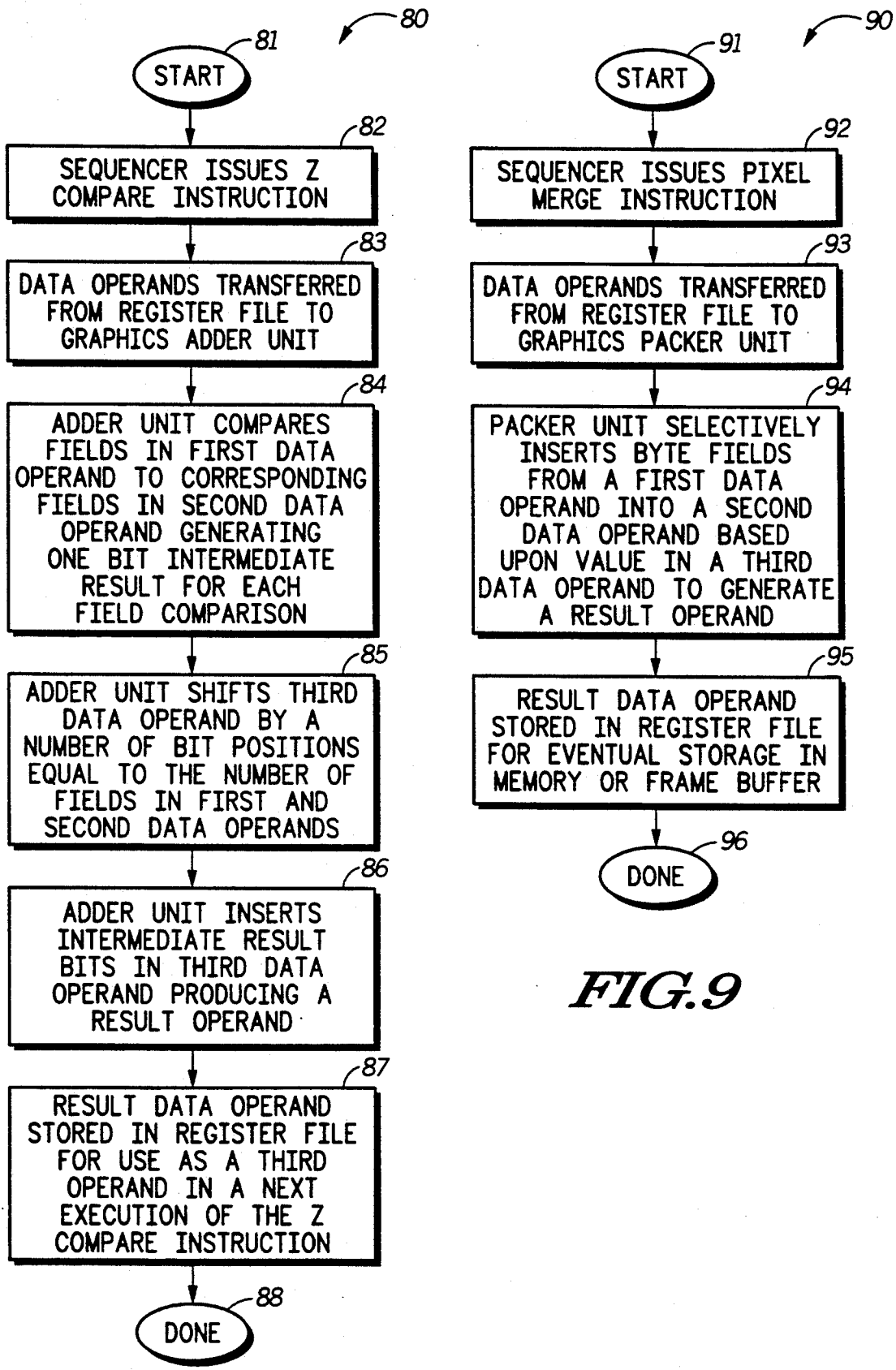
FIG. 8 is a flow diagram for performing the Z-compare instruction of FIG. 4 and FIG. 7.
FIG. 9 is a flow diagram for performing the pixel merge instruction of FIG. 5 and FIG. 7.

Shown in FIG. 7 is a flow diagram 70 illustrating how the Z-compare and pixel merge instructions of the present invention are used to perform the Z-buffering process. At the start of the Z-buffering process, software sets-up the initial graphics operands in the general register file 34. In conjunction with the user software, system 20 will compute new pixel color channel and Z values based upon the initial values provided during set-up. The data processing system 20 begins the execution of the Z-compare instruction of the present invention, as illustrated by flow diagram 80 (FIG. 8). Accordingly, the sequencer 22 issues the Z-compare instruction, and transfers the selected data operands from the register file 34 to the graphics adder unit 30. In response to the issuance of the Z-compare instruction, the graphics adder unit 30 compares the fields in the first data operand to corresponding fields in the second data operand, thereby generating a 1-bit intermediate result for each field compared.

The graphics adder unit 30 shifts a third data operand by a predetermined number of bit positions equal to the number of fields in the first and second data operands. The graphics adder unit 30 inserts the intermediate result bits into the third data operand (in the bit positions vacated by the shift operation), thereby producing a result data operand. The result data operand is stored in the register file 34 for use as a third data operand in a next execution of the Z-compare instruction. As shown in FIG. 7, data processing system 20 repeats the operation described in flow diagram 80 (FIG. 8) until the graphics adder unit 30 completes a predetermined number of comparisons of pixel Z-values (e.g. eight). Upon completing the requisite number of comparisons, the data processing system 20 performs the pixel-merge operation.

The pixel merge operation may be performed either in software or hardware. In accordance with the present invention, data processing system 20 executes a pixel merge instruction as described in flow diagram 90 (FIG. 9). The sequencer 22 issues the pixel merge instruction, and the selected data operands are transferred from the general register file 34 to the graphics packer unit 29. Using the result data operand generated by the execution of the successive Z-compare instructions, the graphics packer unit 29 selectively merges pixels from a first data operand with pixels from a second data operand, thereby generating a pixel result operand comprising one or more pixels. The pixel result operand is temporarily stored in register file 34 and eventually stored in memory 50 or a video frame buffer (not shown). The operation illustrated in flow diagram 70 (FIG. 7) is repeated until all pixels in a selected scan line crossing the polygon being rendered have been computed and stored in memory 50.

The mask value produced by the Z-compare instructions may be used by a pixel merge instruction which places the pixel result operand into the register file 34 for later storage by a STORE instruction executed by the load/store units 25. Alternatively, a CONDITIONAL-STORE instruction executed by the load/store units 25 may directly use the mask value to independently enable the transfer of each byte in the result operand from the register file 34 to memory 50 or a video frame buffer (not shown), via the data bus 48.

When the pixel merge operation is performed in software, the Z-compare operation includes the additional step of encoding the results of the Z-comparisons as previously described in conjunction with FIG. 3.

While the invention has been described in a preferred embodiment, it will be apparent to those skilled in the art that the disclosed invention may be modified in numerous ways and may assume many embodiments other than that specifically set out and described above. For example, the source operands for the graphics instructions may be stored in the main memory 50, and transferred to the source busses 38 via the sequencer 22. Alternatively, the source operands may be stored in the extended register file 35, and transferred to the graphics execution units 29 and 30, via the source busses 38. Furthermore, in the present invention, the size of the data operands, number of fields, and the field sizes may vary according to information encoded in the instruction opcode. Moreover, the number of bits comprising a final mask value, and the selection of which bits of the mask value to use in a given pixel merge instruction may be encoded in the instruction opcode, or alternatively, provided by a fourth data operand. In addition, the Z-compare and pixel merge operations may be combined into a single instruction. Accordingly, it is intended by the appended claims to cover all modifications of the invention which fall within the true spirit and scope of the invention.

We claim:

1. In a data processing system, comprising:
storage means for storing a plurality of data elements and a plurality of instructions, said plurality of data elements comprising data operands for use with said plurality of instructions;
execution means for executing a selected type of graphics instructions;
communications means coupled to said storage means and said execution means, for providing said selected type of graphics instructions to said execution means, said communications means transferring said plurality of data elements between said storage means and said execution means; and
sequencer means coupled to said communications means for providing a sequence of instruction addresses to said storage means, for retrieving a sequence of instructions for execution by said execution means in response thereto, and for issuing said sequence of instructions to said execution means, said sequencer means also retrieving a required number of data elements from said storage means for each instruction in said sequence of instructions;
a method for executing a graphics pixel compare instruction to determine whether to display a pixel of a three-dimensional image, comprising the steps of:
transferring under direction by said sequencer means, a selected number of data operands to said execution means each of said selected data operands comprising one or more values representing a predetermined number of Z-axis coordinates, each of said pixel of said three-dimensional image in an X, Y, and Z Cartesian coordinate system;
comparing, via said execution means, one or more Z-axis coordinates within a first data operand to one or more z-axis coordinates in a corresponding bit-field position within a second data operand to determine a relative Z-axis position of each of the one or more pixels associated with said one or more Z-axis coordinates;
encoding, via said execution means, a pixel compare result bit-vector to uniquely represent possible results of comparing each of said corresponding bit-field positions comprising said one or more Z-axis coordinates in each of said first and second operands, said encoding of said pixel compare result bit-vector being designed such that a predefined set of most likely compare results are readily detectable using a single bit test; and
storing, under direction of said execution means, said pixel compare result bit-vector in said storage means, and using said pixel compare result bit-vector to determine which pixels of said three-dimensional image to display.

2. The method of claim 1 further comprising the step of using information encoded in an operand corresponding to said pixel compare instruction to determine, via said execution means, the number of Z-axis coordinates within said first and said second data operands.

3. In a data processing system, comprising:
storage means for storing a plurality of data elements and a plurality of instructions, said plurality of data elements comprising data operands for use with said plurality of instructions;
execution means for executing a selected type of graphics instructions;
communications means coupled to said storage means and said execution means, for providing said selected type of graphics instructions to said execution means, said communications means transferring said plurality of data elements between said storage means and said execution means; and
sequencer means coupled to said communication means for providing a sequence of instruction addresses to said storage means, for retrieving a sequence of instructions for execution by said execution means in response thereto, and for issuing said sequence of instructions to said execution means, said sequencer means also retrieving a required number of data elements from said storage means for each instruction in said sequence of instructions;

a method for executing a graphics pixel compare instruction to determine whether to display a pixel of a three-dimensional image, comprising the steps of:

transferring, under direction by said sequencer means, a selected number of data operands to said execution means each of said selected data operands comprising one or more values representing a predetermined number of Z-axis coordinates, each of said predetermined number of Z-axis coordinates being associated with one pixel of said three-dimensional image in an X, Y, and Z Cartesian coordinate system;

comparing, via said execution means, one or more Z-axis coordinates within a first data operand to one or more Z-axis coordinates in a corresponding bit-field position within a second data operand to determine a relative Z-axis position of each of the one or more pixels associated with said one or more Z-axis coordinates;

encoding, via said execution means, a pixel compare result bit-vector to uniquely represent possible results of comparing each of said corresponding bit-field positions comprising said one or more Z-axis coordinates in each of said first and second operands, said result bit-vector encoding being suitable for use as a branch offset into a table of instructions defining subsequent operations to be performed by said execution means based upon a result of each comparison; and storing, under direction of said execution means, said pixel compare result bit-vector in said storage means, and using said pixel compare result bit-vector to determine which pixels of said three-dimensional image to display.

4. The method of claim 3 further comprising the step of using information encoded in an opcode corresponding to said pixel compare instruction to determine, via said execution means, the number of Z-axis coordinates within said first and said second data operands.

5. In a data processing system, comprising:
storage means for storing a plurality of data elements and a plurality of instructions, said plurality of data elements comprising data operands for use with said plurality of instructions;

execution means for executing a selected type of graphics instructions;

communications means coupled to said storage means and said execution units, for providing said selected type of graphics instructions to said execution means, said communications means transferring said plurality of data elements between said storage means and said execution means; and sequencer means coupled to said communications means for providing a sequence of instruction addresses to said storage means, for retrieving a sequence of instructions for execution by said execution means in response thereto, and for issuing said sequence of instructions to said execution means, said sequencer means also retrieving a required number of data elements from said storage means for each instruction in said sequence of instructions;

a method for executing a graphics pixel compare and merge instruction to determine whether to display a pixel of a three-dimensional image, comprising the steps of:

transferring, under direction by said sequencer means, a selected number of data operands to said execution means each of said selected data operands comprising one or more values representing a predetermined number of Z-axis coordinates, each of said predetermined number of Z-axis coordinates being associated with one pixel of said three-dimensional image in an X, Y, and Z Cartesian coordinate system;

comparing, via said execution means, one or more Z-axis coordinates within a first data operand to one or more Z-axis coordinates in a corresponding bit-field position within a second data operand to generate a comparison result representing a relative Z-axis position of each of the one or more pixels associated with said one or more Z-axis coordinates;

generating, via said execution means, an intermediate value each bit of which corresponds to the result of said comparison between said one or more Z-axis coordinates within a first data operand to one or more Z-axis coordinates in a corresponding bit-field position within said second data operand; and accumulating, via said execution means, said intermediate value with a third data operand to generate a result mask, each bit of said result mask being used, by said execution means, to control the storage in said storage means, of said pixel associated with each respective Z-axis coordinate.

6. The method of claim 5 further comprising the step of using information encoded in an operand corresponding to said pixel compare and merge instruction to determine, via said execution means, the number of Z-axis coordinates within said first and said second data operands.

7. The method of claim 5 further comprising the step of using information encoded in an opcode corresponding to said pixel compare and marge instruction to determine, via said execution means, which bits of said result mask to use to control the storage of said pixel associated with each respective Z-axis coordinate.

* * * * *

UNITED STATES PATENT AND TRADEMARK OFFICE
CERTIFICATE OF CORRECTION

PATENT NO. : 5,268,995

DATED : December 7, 1993

INVENTOR(S) : Keith E. Diefendorff, et al.

It is certified that error appears in the above-identified patent and that said Letters Patent is hereby corrected as shown below:

Column 12, line 49, change "operand" to --opcode--.

Signed and Sealed this

Twelfth Day of July, 1994

Attest:

BRUCE LEHMAN

*Attesting Officer*      *Commissioner of Patents and Trademarks*